(12) United States Patent
Lee et al.

(10) Patent No.: US 7,729,335 B2
(45) Date of Patent: *Jun. 1, 2010

(54) PROVIDING TRAFFIC INFORMATION RELATING TO A PREDICTION OF CONGESTION STATUS AND USING THE SAME

(75) Inventors: Joon Hwi Lee, Seoul (KR); Chu Hyun Seo, Seoul (KR); Young In Kim, Seoul (KR); Mun Ho Jung, Gyeonggi-do (KR); Moon Jeung Joe, Gyeonggi-do (KR); Dong Hoon Yi, Seoul (KR); Hyong Chol Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 760 days.

This patent is subject to a terminal disclaimer.

(21) Appl. No.: 11/419,139

(22) Filed: May 18, 2006

(65) Prior Publication Data

US 2006/0268707 A1 Nov. 30, 2006

Related U.S. Application Data

(60) Provisional application No. 60/759,963, filed on Jan. 19, 2006, provisional application No. 60/681,971, filed on May 18, 2005.

(30) Foreign Application Priority Data

Jul. 18, 2005 (KR) .................. 10-2005-0065000
Sep. 16, 2005 (KR) .................. 10-2005-0086890
Sep. 16, 2005 (KR) .................. 10-2005-0086891

(51) Int. Cl.
*H04L 3/24* (2006.01)
*H04M 11/04* (2006.01)
*H04W 24/00* (2006.01)
*G06F 19/00* (2006.01)
*G01C 21/00* (2006.01)
*G11C 21/30* (2006.01)

(52) U.S. Cl. .................. 370/349; 455/404.2; 455/456.1; 701/117; 701/207; 701/208

(58) Field of Classification Search .................. 370/237, 370/252, 230, 254, 476, 535, 349; 455/245.1, 455/404.2, 456.1; 701/117, 207–208
See application file for complete search history.

(56) References Cited

U.S. PATENT DOCUMENTS 4,907,159 A 3/1990 Mauge (Continued)

FOREIGN PATENT DOCUMENTS

DE 101 01 349 8/2002

(Continued)

OTHER PUBLICATIONS

Office Action dated Jan. 2, 2009 for U.S. Appl. No. 11/419,095. 32 pages.

(Continued)

*Primary Examiner*—Steven H Nguyen
*Assistant Examiner*—Candal Elpenord
(74) *Attorney, Agent, or Firm*—Fish & Richardson P.C.

(57) ABSTRACT

A method for identifying traffic information includes receiving traffic data including a first identifier, information corresponding to a prediction of an amount of congestion for a particular link, and information corresponding to a location associated with the particular link. The first identifier enables a determination of a type of the information that is included within the received traffic data. The method also includes determining a type of information included within the received traffic data based on the first identifier and determining congestion amount prediction information based on the information included in the received traffic data only if the first identifier enables a determination that the received traffic data includes a prediction related to congestion amount. The method further includes determining location information based on the information that is included in the received traffic data corresponding to the location associated with the particular link identifying traffic information based on the determined congestion amount prediction information and the determined location information.

14 Claims, 14 Drawing Sheets

U.S. PATENT DOCUMENTS

| | | | |
|---|---|---|---|
| 5,933,100 A | 8/1999 | Golding | |
| 6,434,477 B1 | 8/2002 | Goss | |
| 6,438,490 B2 * | 8/2002 | Ohta | 701/210 |
| 6,453,230 B1 * | 9/2002 | Geurts | 701/117 |
| 6,477,459 B1 | 11/2002 | Wunderlich | |
| 6,597,982 B1 | 7/2003 | Schmidt | |
| 6,615,133 B2 | 9/2003 | Boies et al. | |
| 6,741,932 B1 * | 5/2004 | Groth et al. | 701/210 |
| 6,990,407 B1 * | 1/2006 | Mbekeani et al. | 701/117 |
| 6,996,089 B1 * | 2/2006 | Ruf et al. | 370/349 |
| 7,106,219 B2 * | 9/2006 | Pearce | 340/995.13 |
| 7,251,558 B1 * | 7/2007 | McGrath | 701/117 |
| 7,355,528 B2 | 4/2008 | Yamane | |
| 7,373,247 B2 * | 5/2008 | Park | 701/208 |
| 7,376,509 B2 * | 5/2008 | Endo et al. | 701/209 |
| 2004/0198339 A1 | 10/2004 | Martin | |
| 2004/0225437 A1 | 11/2004 | Endo et al. | |
| 2005/0027437 A1 * | 2/2005 | Takenaga et al. | 701/117 |
| 2005/0043880 A1 * | 2/2005 | Yamane et al. | 701/200 |
| 2005/0143906 A1 * | 6/2005 | Ishikawa et al. | 701/200 |
| 2005/0206534 A1 * | 9/2005 | Yamane et al. | 340/994 |
| 2005/0209772 A1 * | 9/2005 | Yoshikawa et al. | 701/200 |
| 2005/0231393 A1 | 10/2005 | Berger | |
| 2006/0268721 A1 | 11/2006 | Lee | |
| 2006/0281444 A1 | 12/2006 | Jung | |

FOREIGN PATENT DOCUMENTS

| | | |
|---|---|---|
| DE | 102004005750 A1 | 9/2004 |
| EP | 1 006 684 | 6/2000 |
| EP | 1 030 475 | 8/2000 |
| EP | 1 041 755 | 10/2000 |
| EP | 1 079 353 | 2/2001 |
| EP | 1 376 512 | 1/2004 |
| EP | 1437573 A2 | 7/2004 |
| EP | 1 445 750 | 8/2004 |
| EP | 1 460 599 | 9/2004 |
| JP | 09-062884 | 3/1997 |
| JP | 11-160081 | 6/1999 |
| JP | 2001-082967 | 3/2001 |
| JP | 2001-272246 | 10/2001 |
| JP | 2004-164373 | 6/2004 |
| JP | 2004-295736 | 10/2004 |
| JP | 2004-355662 | 12/2004 |
| JP | 2005-056061 | 3/2005 |
| KR | 10-1999-0025959 | 4/1999 |
| KR | 10-2002-0017535 | 3/2002 |
| KR | 10-2003-0034915 | 5/2003 |
| KR | 10-2003-0037455 | 5/2003 |
| KR | 10-2004-0033141 | 4/2004 |
| KR | 10-2005-0062320 | 6/2005 |
| KR | 10-2006-0063563 | 6/2006 |
| KR | 10-2006-0063629 | 6/2006 |
| KR | 10-2006-0076574 | 7/2006 |
| WO | WO 98/26395 | 6/1998 |
| WO | WO 98/26396 | 6/1998 |
| WO | WO 00/30058 | 5/2000 |
| WO | WO 00/36771 | 6/2000 |
| WO | WO 00/39774 | 7/2000 |
| WO | WO 01/06478 | 1/2001 |
| WO | WO 02/01532 | 1/2002 |
| WO | WO 02/082402 | 10/2002 |

OTHER PUBLICATIONS

European Search Report dated Oct. 9, 2008 for Application No. 06747436.1, 10 pages.

International Search Report dated Oct. 19, 2006 for Application No. PCT/KR2006/002068, 1 page.

International Search Report dated Aug. 28, 2006 for Application No. PCT/KR2006/001859, 1 page.

International Search Report dated Aug. 28, 2006 for Application No. PCT/KR2006/001860, 1 page.

International Search Report dated Sep. 6, 2006 for Application No. PCT/KR2006/001834, 1 page.

International Search Report dated Oct. 19, 2006 for Application No. PCT/KR2006/001835, 2 pages.

European Search Report dated Jun. 30, 2008 for Application No. 06747440.3, 10 pages.

European Search Report dated Aug. 11, 2008 for Application No. 06747441.1, 8 pages.

European Search Report dated Aug. 14, 2008 and Jul. 28, 2008 for Application No. 06747433.8, 11 pages.

European Search Report dated Sep. 30, 2008 for Application No. 06747474.2, 8 pages.

Office Action dated Dec. 1, 2008 for U.S. Appl. No. 11/424,111, 23 pages.

European Search Report dated Oct. 23, 2009 for Application No. EP 09172354.6, 7 pages.

* cited by examiner

FIG. 2b

```
<ctt_message>    =
<intunli>(mid),                      message identifier
<intunti>(ver),                      version number
<intunli>                            message length in expressed in byte
<bitswitch>(selector),               message element
if(selector=xxxxxxx1)<time_t>,       generation time of message
if(selector=xxxxxx1x)<intunlo>,      Reserved for future use
if(selector=xxxxx1xx)<intunlo>,      Reserved for future use
if(selector=xxxx1xxx)<intunlo>,      Reserved for future use
if(selector=xxx1xxxx)<intunlo>,      Reserved for future use
if(selector=xx1xxxxx)<intunlo>,      Reserved for future use
if(selector=x1xxxxxx)<intunlo>,      Reserved for future use
if(selector=1xxxxxxx)<ctt_components>,  message component of CTT
                                        information
```

FIG. 2c

```
<ctt_components>:=
  <intunti>(n),                      the number of components
  n*<ctt_component()>;               message component of CTTnformation
```

```
<ctt_component (x)>:=  : Template of component of CTT message
   <intunti>(id),      : identifier
   <intunti>(n),       : length of component data in byte (n)
   n*<bytes>;          : component data
```

FIG. 2e

| | |
|---|---|
| <ctt_component (x)>:= | : CTT Loc |
|   <intunti>(id), | : identifier |
|   <intunli>(n), | : length of component data in byte (n) |
|   <tpeg_loc_container>; | : TPEG location container |

FIG. 2f

| | |
|---|---|
| <ctt_component (8A)>:= | : Congestion and Travel Time |
|   <intunti>(id), | : identifier, id=8A |
|   <intunli>(n), | : length of component data in byte (n) |
|   <ctt41>, | : language code |
|   <short_string>; | : Additional information |

FIG. 3a

```
<ctt_component (80)>:=        : Congestion and Travel Time Status
   <intunti>(id),             : identifier, id=80
   <intunti>(n),              : length of component data in byte (n)
   m*<status_component()>;    : status component
```
                                                                                                   3c   3b3a

FIG. 3b

```
<status_component(00)>:=   : average speed on a link
<intunti>(id),             : identifier, id=00
<intunti>(n),              : length of component data in byte (n)
<intunti>;                 : speed (km/h)
```

FIG. 3c

```
<status_component(01)>:=   : link travel time
<intunti>(id),             : identifier, id=01
<intunti>(n),              : length of component data in byte (n)
<intunti>;                 : time (second)
```

FIG. 3d

```
<status_component(02)>:=   : link delay time
<intunti>(id),             : identifier, id=02
<intunti>(n),              : length of component data in byte (n)
<cti01>;                   : time (second)
```

FIG. 3e

| | |
|---|---|
| <status_component(03)>:= | : congestion type |
| <intunti>(id), | : identifier, id=03 |
| <intunti>(n), | : length of component data in byte (n) |
| <cti01>; | : congestion type |

FIG. 4a

| | |
|---|---|
| <cti_component (81)>:= | : Prediction of Congestion and Travel Time Status |
| <intunti>(id), | : identifier, id=81 |
| <intunti>(n), | : length of component data in byte (n) |
| m*<prediction_status_component()>; | : status component |

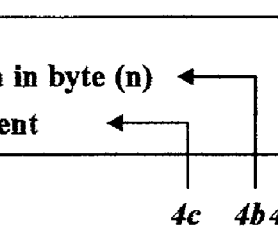

FIG. 4b

| | |
|---|---|
| <prediction_status_component(00)>:=:predicted average speed for a link | |
| <intunti>(id), | : identifier, id=00 |
| <intunti>(n), | : length of component data in byte (n) |
| <intunti>; | : speed (km/h) |
| <intunlo>; | : predicted time (UTC) |

FIG. 4c

| | |
|---|---|
| <prediction_status_component(01)>:=: predicted travel time for a link | |
| <intunti>(id), | : identifier, id=01 |
| <intunti>(n), | : length of component data in byte (n) |
| <intunti>; | : time (second) |
| <intunlo>; | : predicted time (UTC) |

FIG. 4d

```
<prediction_status_component(02)>:=    congestion type
<intunti>(id),                          : identifier, id=02
<intunti>(n),                           : length of component data in byte (n)
<ctt04>;                                : congestion tendency
```

41

| TPEG Table CTT Information 04(CTT 04) congestion tendency ||||
|---|---|---|---|
| code | meaning | description | example |
| 0 | unknown | | |
| 1 | drawing | | |
| 2 | eliminating | | |
| 3 | constant | | |
| | End of version k | | |
| : | : | : | : |
| 255 | | | |

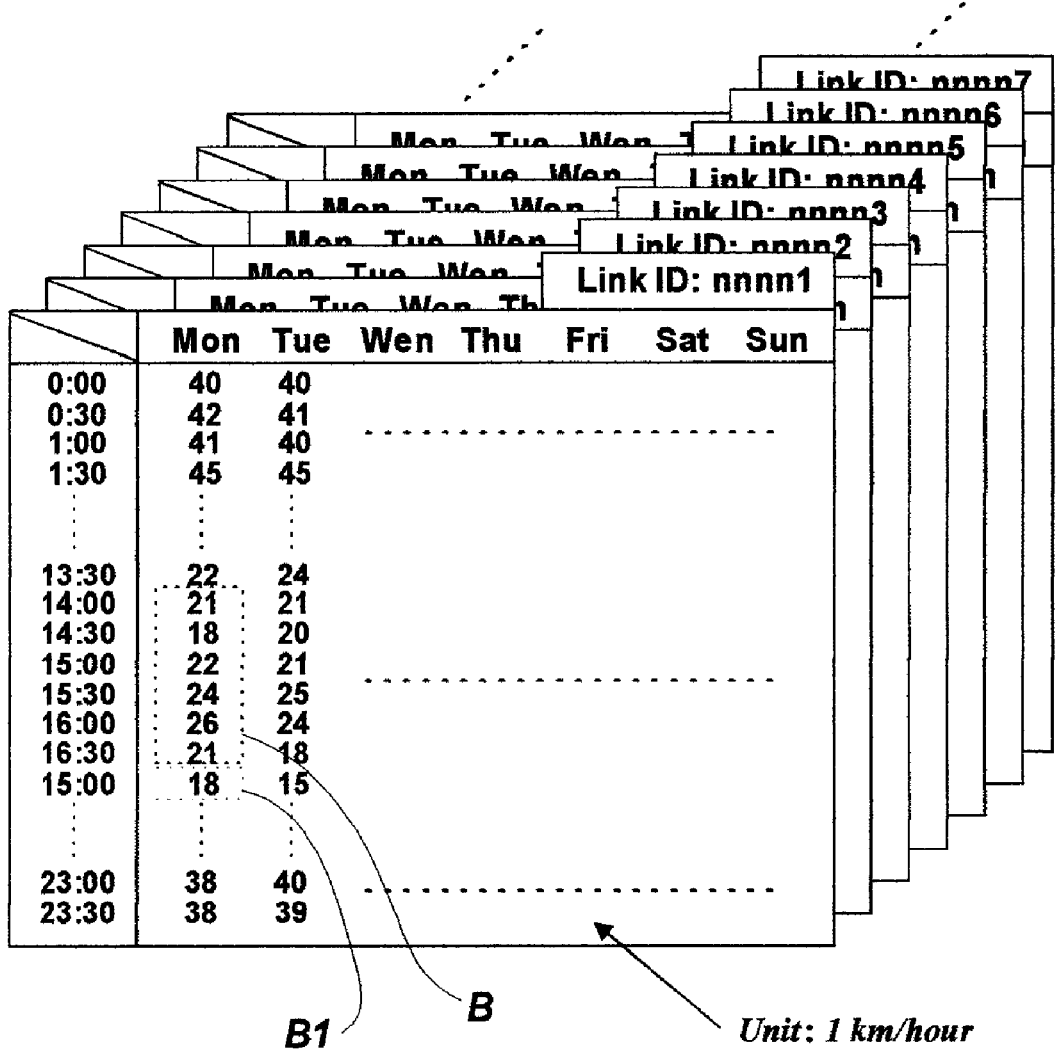

FIG. 6b

| Common Data Component Element |
|---|

- N : The number of Common Data Component Templates
- N x Common Data Component Template : N Common Data Component Templates

FIG. 6c

| Common Data Component Template |
|---|

- ID : Identifier of data object
- n : data length of data object

| ID | Data Object |
|---|---|
| 1 | average speed on a link |
| 2 | link travel time |
| 3 | link delay time |
| 4 | congestion information (congestion type) |
| 5 | predicted average speed on a link |
| 6 | predicted link travel time |
| 7 | congestion tendency |
| ⋮ | ⋮ |

FIG. 8
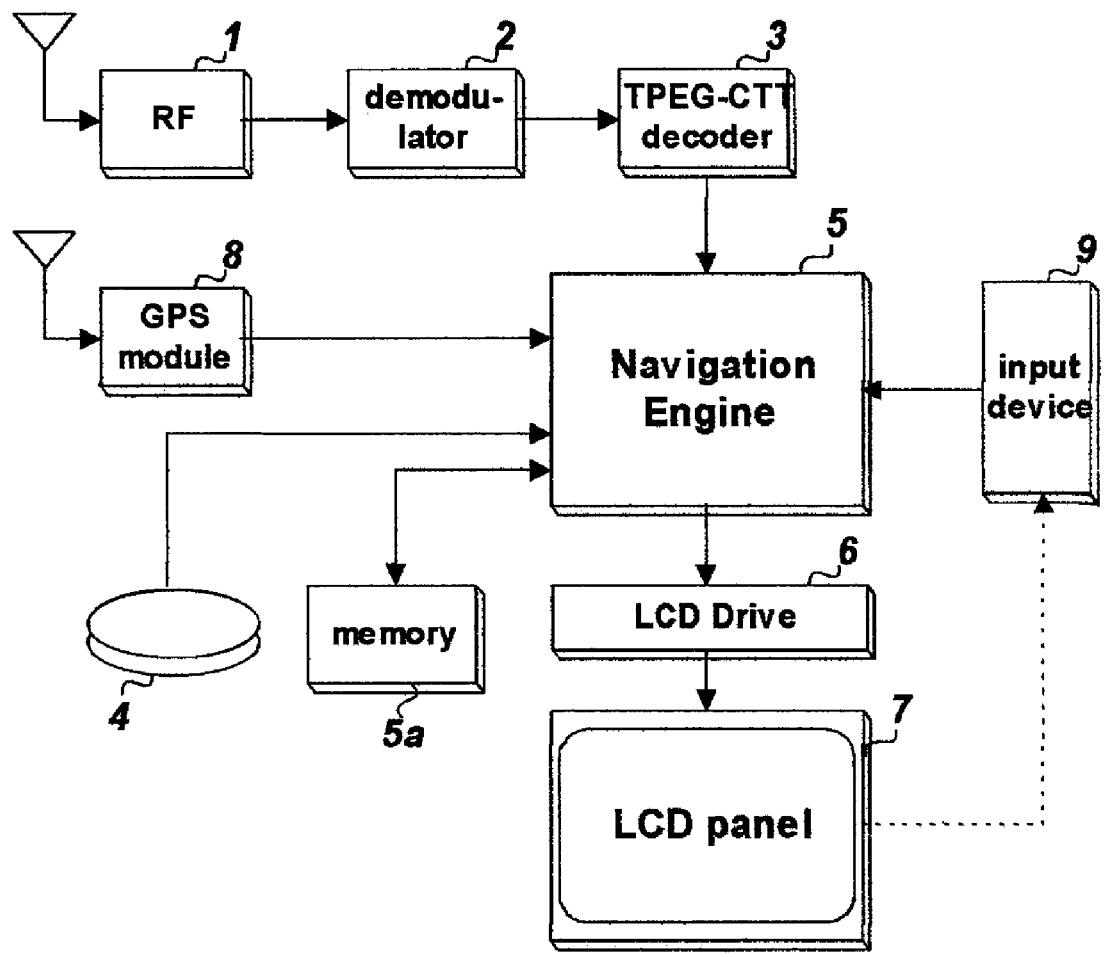
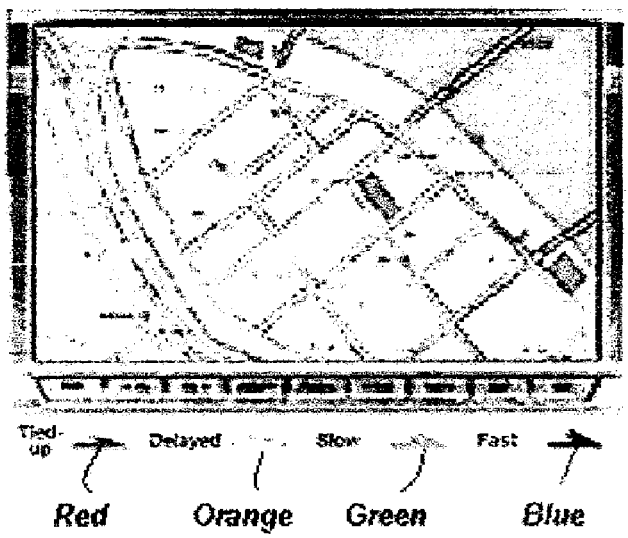
FIG. 9a

PROVIDING TRAFFIC INFORMATION RELATING TO A PREDICTION OF CONGESTION STATUS AND USING THE SAME

CROSS-REFERENCE TO RELATED APPLICATIONS

The present application claims priority from U.S. provisional application Nos. 60/681,971 filed May 18, 2005, which is titled "Traffic information signal and method and apparatus for providing the signal," and 60/759,963 filed Jan. 19, 2006, which is titled "Traffic information providing method," the entire contents of which are incorporated herein by reference. The present application also claims priority from Korean application Nos. 10-2005-0065000 filed Jul. 18, 2005, 10-2005-0086890, filed Sep. 16, 2005, and 10-2005-0086891, filed Sep. 16, 2005, the entire contents of which are incorporated herein by reference.

BACKGROUND

1. Field

This disclosure relates to providing traffic information relating to a prediction of congestion status and using the same.

2. Description of the Related Art

With the advancement in digital signal processing and communication technologies, radio and TV broadcasts are in the process of being digitalized. Digital broadcast can provide various information (e.g., news, stock prices, weather, traffic information, etc) as well as audio and video contents.

Because traffic information receiving terminals made by different manufacturers should be able to detect and interpret traffic information broadcast in the same way, traffic information may better be delivered and utilized in a standardized format.

SUMMARY

In a general aspect, a method for method for identifying traffic information is provided. The method includes receiving traffic data including one or more identifiers, information reflecting a predicted amount of congestion on a link, information reflecting a predicted congestion tendency for the link, information reflecting a predicted amount of time to traverse the link, information reflected a predicted travel speed for the link, and information reflecting a location corresponding to the link. The one or more identifiers enable a determination of one or more types of information that are included within the received traffic data. The method also includes determining the one or more types of information included within the received traffic data based on the identifier and dependent upon whether the identifier enables a determination that the received traffic data includes information related to congestion amount, determining congestion amount prediction information based on the received traffic data. The method further includes dependent upon whether the identifier enables a determination that the received traffic data includes information related to congestion tendency, determining congestion tendency prediction information based on the information included in the received traffic data and dependent upon whether the identifier enables a determination that the received traffic data includes information related to link traversal time, determining travel time prediction information based on the received traffic data. Further, the method includes dependent upon whether the first identifier enables a determination that the received traffic data includes information related to travel speed prediction, determining travel speed prediction information based on the received traffic data. Also, the method further includes determining location information based on the information that is included in the received traffic data reflecting the location corresponding to the particular link identifying traffic information based on the determined location information and at least one of the determined congestion amount prediction information, the determined congestion tendency prediction information, the determined travel time prediction information, and the determined travel speed prediction information.

In another general aspect, a method for identifying traffic information is provided. The method includes receiving traffic data including a first identifier, information corresponding to a prediction of an amount of congestion for a particular link, and information corresponding to a location associated with the particular link. The first identifier enables a determination of a type of the information that is included within the received traffic data. The method also includes determining a type of information included within the received traffic data based on the first identifier and determining congestion amount prediction information based on the information included in the received traffic data only if the first identifier enables a determination that the received traffic data includes a prediction related to congestion amount. The method further includes determining location information based on the information that is included in the received traffic data corresponding to the location associated with the particular link identifying traffic information based on the determined congestion amount prediction information and the determined location information.

Implementations may include one or more additional features. For instance, determining congestion amount prediction information may include accessing received data reflecting, among other items, results of measurements made with respect to traffic previously traversing the link, and computing a prediction for a future congestion amount based on the received data. Determining congestion amount prediction information may involve accessing information provided within the received traffic data and recognizing that data as the predicted congestion amount.

The method may also include receiving information corresponding to a message management structure including information corresponding to a generation time of information reflected in the traffic data. The generation time included within the received message management structure may relate to a plurality of message component structures that correspond to more than one of a predicted or current traffic tendency, a predicted or current amount of traffic, a predicted or current speed, or a predicted or current time to traverse a particular link. Each message component structure may further include an identifier specific to the type of information and the first identifier may be an identifier, in a message component structure, specific to the prediction of an amount of congestion for the particular link. Information corresponding to a chronological indication associated with the predicted congestion amount revealed by the received information may be received. The chronological indication may reflect a particular time of day for which the predicted congestion amount corresponds. The chronological indication may be reflected using the universal time co-ordinated standard.

The method may further include determining the congestion amount prediction information and the location information in a single step. The location information may be determined before the congestion amount prediction information is determined. Receiving traffic data may include decoding the traffic data such that the received traffic data is decoded traffic data. The prediction amount congestion information may reflect an average of more than one indication of congestion amount associated with the link. The prediction amount congestion information may reflect a weighted summation of more than one indication of congestion amount associated with the link.

Further, in the method, receiving information corresponding to a prediction of an amount of congestion may include receiving a value associated with a text description of an amount of congestions, and determining, with the received value, the text description. Receiving information corresponding to a prediction of an amount of congestion may include receiving a predicted congestion amount for the link including a text descriptor. The information corresponding to a prediction of an amount of congestion for a particular link may reflect the predicted congestion amount.

Also, in another general aspect, an apparatus for identifying traffic information is provided. The apparatus includes an interface configured to receive traffic data including a first identifier, information corresponding to a prediction of an amount of congestion for a particular link, and information corresponding to a location associated with the particular link. The first identifier enables a determination of a type of the information that is included within the received traffic data. The apparatus also includes a processor configured to determine a type of information included within the received traffic data based on the first identifier and dependent upon whether the first identifier enables a determination that the received traffic data includes a prediction related to a congestion amount, determine congestion amount prediction information based on the information included in the received traffic data. The processor is also configured to determine location information based on the information that is included in the received traffic data corresponding to the location corresponding to the particular link and identify traffic information based on the determined congestion amount prediction information and the determined location information.

Implementations may include one or more additional features. For instance, the processor may be configured to receive traffic data including information corresponding to a version number of information reflected in the traffic data. The version number may be associated with a specific syntax of the data where any one of multiple syntaxes may be used. The processor may be configured to receive information corresponding to a message management structure including information corresponding to a generation time of information reflected in the traffic data. The processor may be configured to receive information corresponding to a data length of the received data. The processor may be configured to receive the predicted congestion amount reflected as one value in a set of possible values.

In the apparatus, the processor may be further configured to determine the prediction of an amount of congestion for a particular link only if the first identifier reveals that the traffic data relates to a prediction of an amount of congestion for a particular link.

Further, in another general aspect, a method for identifying traffic information is provided. The method includes receiving characteristic information reflecting a characteristic of a link and receiving location information reflecting a location corresponding to the link. The method also includes identifying traffic information based on the characteristic information and the location information.

Implementations may include one or more additional features. For instance, receiving characteristic information may include receiving prediction information reflecting a predicted congestion tendency of the link. Receiving characteristic information may include receiving prediction information reflecting a predicted travel speed for the link. Receiving characteristic information may include receiving information reflecting a current amount of congestion on the link. Receiving characteristic information may include receiving prediction information reflecting a predicted amount of time to traverse the link. Receiving characteristic information may include receiving information reflecting a current amount of time to traverse the link. Receiving characteristic information may include receiving prediction information including a predicted congestion tendency for the link, a predicted travel speed for the link, and a predicted amount of time to traverse the link. Receiving characteristic information may include receiving information reflecting a current amount of congestion on the link and a current amount of time to traverse the link.

The method may further include receiving information reflecting a message management structure including an indication of a time at which information reflected in the traffic data was generated, an identifier associated with a type of information also included within the message management structure, and a data length of the message management structure The details of one or more implementations are set forth in the accompanying drawings and the description below. Other features will be apparent from the description and drawings, and from the claims.

BRIEF DESCRIPTION OF THE DRAWINGS

The accompanying drawings illustrate various implementations.

In the drawings:

FIG. 2b illustrates a syntax of TPEG-CTT messages;

FIG. 2c shows syntax of formats of components carrying congestion status information;

FIGS. 2d and 2e show syntax of a CTT component carrying CTT events and location information, respectively;

FIG. 2f shows syntax of a CTT component carrying additional information of congestion status information;

FIG. 3a illustrates a syntax of the traffic/congestion information included in the CTT event container;

FIGS. 3b through 3e illustrate syntaxes of the average link speed, the link travel time, the link delay, and the congestion type included in the status component shown in FIG. 3a, respectively;

FIG. 4a illustrates a syntax of the traffic/congestion prediction information included in the CTT event container;

FIGS. 4b through 4d illustrate syntaxes of the predicted average link speed, the predicted link travel time, and the tendency information included in the status component shown in FIG. 4a, respectively;

FIG. 5a illustrates an example of a database storing the history of traffic status at each link for providing the traffic/congestion prediction information;

FIG. 5b illustrates an example of a graphical user interface configured to predict the average speed at a specific link using the database shown in FIG. 5a;

FIG. 6b shows syntax of a common data table inserted in a component frame;

FIG. 6c shows syntax of a common data component template that is an entry of a common data table;

FIG. 8 illustrates a block diagram of a navigation terminal installed in a car for receiving traffic information transmitted from a server;

FIGS. 9a through 9c illustrate examples of graphical user interfaces configured to display the average speed at each link.

DETAILED DESCRIPTION

One such use for digital broadcasts is to satisfy an existing demand for traffic information. Proposals that involve the use of digital broadcasts for this purpose contemplate the use of standardized formatting of traffic information to be broadcast. This approach may be used to enable the use of traffic information receiving terminals made by different manufacturers, which each could be configured to detect and interpret traffic information broadcast in the same way.

Figure 1:
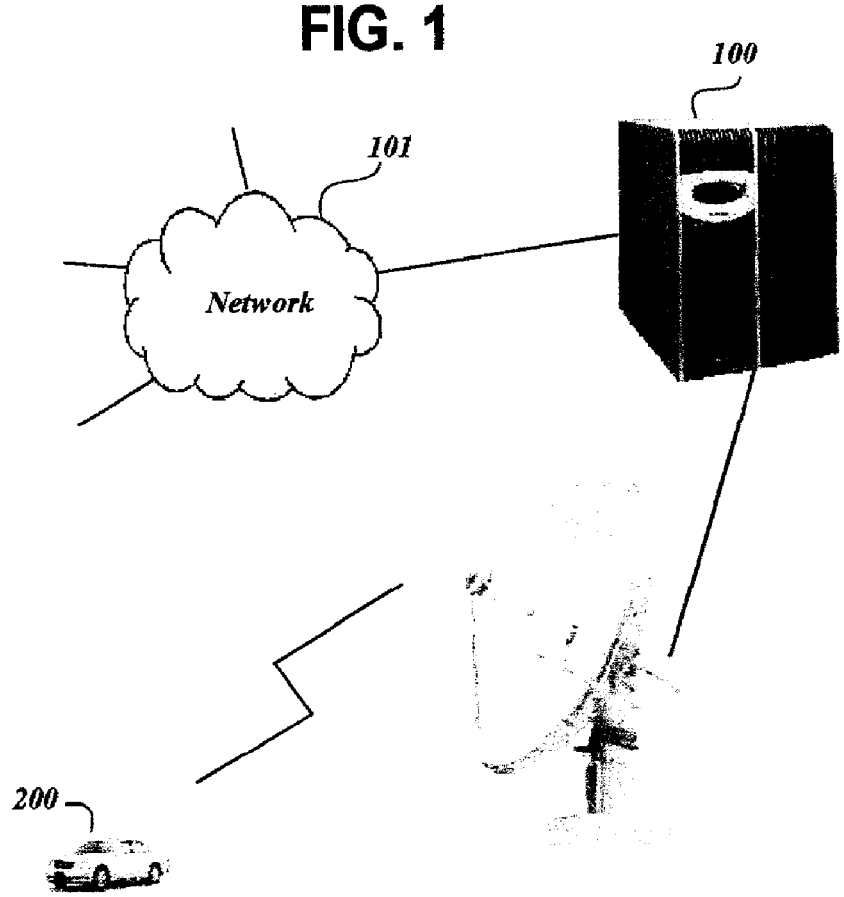
FIG. 1 illustrates a schematic diagram of a network through which traffic information is provided.

FIG. 1 is a schematic diagram of a network through which traffic information is provided. A traffic information providing server 100 in a broadcast station may transmit traffic information collected from various sources (e.g., operator input, or information received from another server or probe cars through a network 101) wirelessly so that a traffic information receiving terminal (e.g., navigation system installed in a car 200) may receive the traffic information.

Figure 2A:
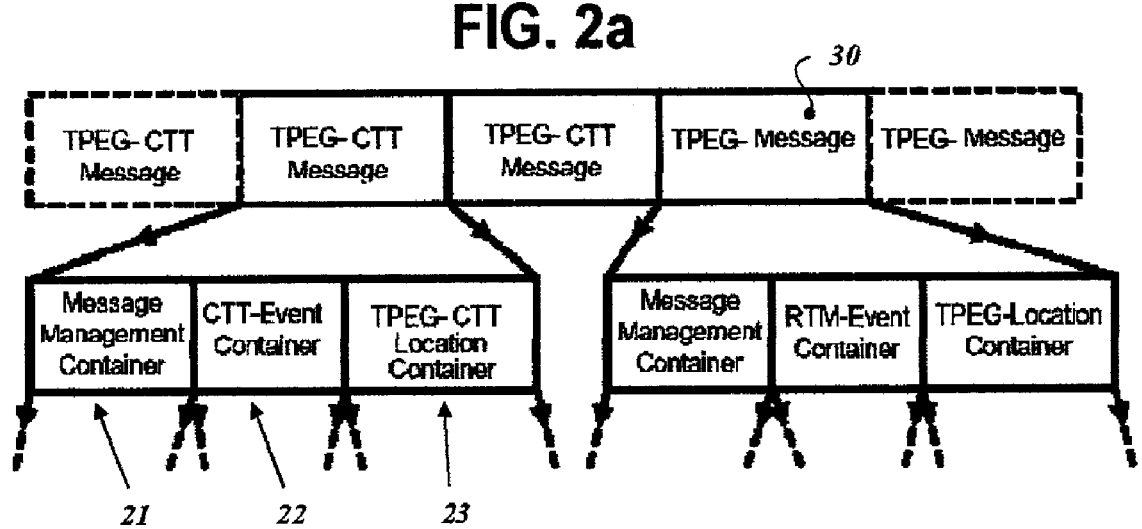
FIG. 2a illustrates a syntax of wirelessly transmitted traffic information.

As shown in FIG. 2a, the traffic information wirelessly transmitted from the traffic information providing server 100 may be a sequence of TPEG-CTT (transport protocol expert group-congestion and travel-time Information) messages. A message segment of the sequence, i.e., a TPEG-CTT message, whose syntax is shown in FIG. 2b, may include a message management container 21, a CTT event container (or Application Event Container) 22, and TPEG-CTT location container 23. The TPEG-CTT message may also include different type of containers other than, less than, or in addition to the CTT event container as in the TPEG-CTT message 30.

The message management container 21 may be used for managing date and time information. The time information may include message generation time (e.g., a chronological time indication). The message generation time may be included in every TPEG-CTT message when the corresponding message is transmitted. The CTT event container 22 may include congestion and travel time status and predicted congestion and travel time status of links, i.e., road segments. The congestion and travel time status may include average link speed, link travel time, link delay, or congestion type, etc.

The TPEG-CTT location container 23 may employ various location reference processes. For example, a location reference process using a coordinate system or a location reference process using pre-promised links may be used. When a coordinate system is used, the coordinates (latitudes and longitudes) of the start and end positions of a link for which the TPEG-CTT message is created, may be transmitted. When a reference process using pre-promised links is used, a unique identification for a specific link on a receiving device may be transmitted. For example, a receiving device may include a locally stored network of links, wherein each link may be identified by a unique identifier. A link may refer to a road segment which starts and ends at junctions and has no junction in between. The coordinate system may be the WGS 84 model. A text formatted name of the link may be transmitted.

In various implementations, a CTT event container and a TPEG-CTT location container, as illustrated in FIG. 2c, are composed of one or more CTT components 201. Each of CTT components may be constructed according to the syntax shown in FIG. 2d if it carries congestion status information while it may be constructed according to the syntax shown in FIG. 2e if the component carries location information.

A CTT event container 22 may be composed of one component or a plurality of CTT components. In various implementations, CTT components including an ID of 80 h (notation 'h' means hexadecimal) or 84 h includes one or more status components including basic traffic information such as the average link speed, link travel time, link delay, or congestion type. In the description, specific IDs are described as assignments to structures associated with specific information. The actual value of an assigned ID (e.g., 80 h) is exemplary, and different implementations may assign different values for specific associations or circumstances.

In various implementations, CTT components including an ID of 81 h include one or more status components including predicted CTT status. The predicted CTT status may include predicted average link speed, predicted link travel time, or congestion acceleration tendency. The congestion acceleration tendency may include information indicative of the tendency of congestion status. The congestion acceleration tendency will be described as a type of prediction information as the congestion status in the near future may be predicted from it.

In various implementations, the TPEG-CTT message may comprise CTT components structured as FIG. 2f to deliver additional information of traffic information. As shown, an identifier 8Ah may be assigned to the CTT component carrying additional information, and a language code that is indicative of language used for the additional information may also be included in the CTT component.

FIG. 3a shows an example of a syntax of the CTT component included in the CTT event container, which delivers the current congestion and travel time status. The CTT component may be assigned an ID 3a including a value of 80 h or 84 h and may include m status components 3c and a field 3b indicative of the length of the data included in the status components included therein, the length being expressed in the unit of byte. Other units, such as bit, may be used.

The status components 3c may include information on the average link speed, the link travel time, the link delay, and/or the congestion type. The syntax, according to one implementation, of each of which, is shown in FIGS. 3b, 3c, 3d, and 3e, respectively. In one implementation, status components delivering the average link speed, the link travel time, the link delay, and the congestion type are assigned IDs of '00', '01', '02', and '03', respectively. The link delay may be, for example, the delay in the time required to pass through the link under current traffic condition with respect to the time required to pass through the link at a limit speed specified in the link. The link delay may be expressed in the unit of minute, second, tens or tenths of seconds, or another unit. The link delay may be calculated with respect to the average time required to pass the link on the same days or in the same time slot. The link delay may enable traffic information receiving terminals that do not have information on each link (e.g., speed limit in the link, length of the link, etc) to expect the time required to pass a link.

FIG. 4a shows an example of a syntax of the CTT component included in the CTT event container, which delivers the predicted congestion and travel time status. The CTT component may be assigned an ID 4a including a value of 81 h and may include m status components 4c and a field 4b indicative of the length of the data included in the status components included therein, the length, may be, for example, expressed in the unit of byte.

The status components 4c may include information on the predicted average link speed, the predicted link travel time, and/or, the congestion acceleration tendency, the syntax, according to one implementation, of each of which, is shown in FIGS. 4b, 4c, and 4d, respectively. The status components delivering the predicted average link speed, the predicted link travel time, and the congestion acceleration tendency may be assigned IDs of '00', '01', and '02', respectively.

Alternatively, the predicted congestion and travel time status may be delivered by the CTT component that delivers the current congestion and travel time status (e.g., average link speed, link travel time, link delay, congestion type) including an ID of 80 h or 84 h. In this case, the status components delivering the predicted congestion and travel time status may be assigned IDs different from the IDs of the status components delivering the current congestion and travel time status.

The server 100 may create predicted status information shown, according to one implementation, in FIGS. 4b through 4d based on the traffic information which may be collected from various sources and/or its own traffic information database, which will be described in detail below.

To provide predicted traffic information, the server 100 may store the average speed at each link according to day, time slot, week, month, or year. For example, in one implementation, the server 100 may store the average speed at each link at intervals, such as every 30 minutes, as shown in FIG. 5a. The unit of the values shown in FIG. 5a is km/h, though other units, such as m/s, may be used.

Figure 5B:
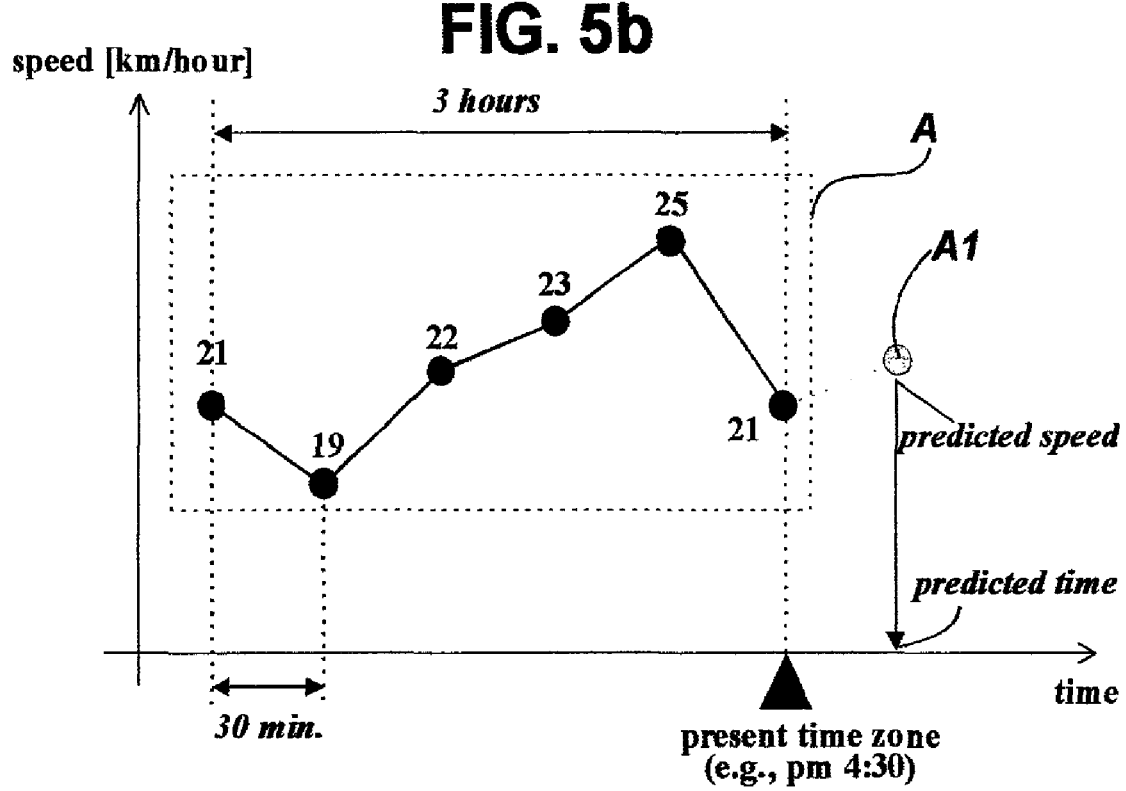

Additionally, in one implementation, the server 100 may store the average speed, or other information, such as travel time or congestion, of links for which the traffic information is currently provided at intervals for a predetermined period of time (e.g., 3 hours) and compare the pattern of change in the average speed for the period of time with the pattern of change in the same time slot of the same day stored in the database. For example, if FIG. 5b shows the pattern of change in the average speed for the past 3 hours from 4:30 pm on a Monday afternoon (A), the server 100 compares the data with the average speeds of from 1:30 pm to 4:30 pm stored in the database (B). If the difference (e.g., the sum of the absolute values of the difference in average speeds at each corresponding time or a weighted sum thereof) is less than a predetermined threshold, the server 100 reads the average speed B1 at 30 minutes after the current time (i.e., the average speed at 5:00 pm) from the database and transmits the value as the predicted average speed in the corresponding link according to the syntax shown in FIG. 4b. The predicted average link speed may be expressed in the unit of km/h, for example. The predicted time (e.g., 5:00 pm in the previous example) may also be transmitted in the form of the syntax shown in FIG. 4b, for example in UTC (Universal Time Coordinated) format.

Explaining FIG. 4b in more detail, the predicted time in UTC format may be indicative of a target time or date in the future, and the predicted speed indicates average speed (in km/h, for example) on a link at the target time or date, such as, a day of year, month of year, year, holiday, time of day, rush hour, event, morning/afternoon/evening. For example, the link may be an inter-road between cities, a bridge, or a road between intersections. The data may be incorporated into the component in units of a byte unit, and/or it may be incorporated in units of a bit or a long byte, according to data size. In addition, the speed may be expressed in various units, for example, m/sec, mile/hour, etc.

In one implementation, if the calculated difference exceeds the predetermined threshold, i.e., it is determined that the pattern of change in the average speed stored in the database does not match the pattern of change in the measured average speed, the server 100 may not provide the predicted average link speed, or alternatively, the server 100 may estimate the predicted average link speed Al from the average link speeds extracted for the past 3 hours and provide the estimated value as the predicted average link speed. Various processes may be used to estimate the average speed from the measured average speed values. One process, for example, involves calculation of a weighted sum which gives the latest sample value the highest weight and gives the oldest sample value the lowest weight. For example, the predicted speed Al in FIG. 5b can be extracted by calculating 0.5×current speed+0.2×speed of 30 minutes ago+0.1×speed of 1 hour ago+0.1×speed of 1.5 hours ago +0.05×speed of 2 hours ago+0.05×2.5 hours ago, etc.

After calculating the predicted average link speed in the aforementioned way, the server 100 may calculate the predicted travel time of each link and transmit the predicted travel time of each link along with associated predicted time according to the syntax shown in FIG. 4c. The predicted travel time may be calculated by multiplying the predicted average speed at each link by the length of the corresponding link stored in the database. The predicted travel time may be expressed in the unit of minutes, tens of seconds, second, or a unit smaller than seconds, for example.

When providing the average speed in a particular link, the server 100 may compare the current average speed with the average speed at the previous time slot and provide the tendency of change in the average link speeds 41 according to the syntax shown in FIG. 4d. In one implementation, the information, which is called the congestion acceleration tendency, may have one value among several values defined by a table shown in FIG. 4d. For example, the information may be assigned 1 if the current average speed is higher than the average speed of 30 minutes ago. The congestion acceleration tendency may be assigned 2 if the current average speed is lower than the average speed of 30 minutes ago. The congestion acceleration tendency may be assigned 3 if the average speed remains unchanged. If there is no available data to compare, the congestion acceleration tendency may be assigned 0. The congestion acceleration tendency information may enable a driver to choose a route that shows improvement in the traffic congestion from among several possible routes showing similar average speeds. Instead of providing the congestion acceleration tendency in the form of a number (e.g., 1, 2, 3, etc.), the server 100 may provide the rate of change of the average speed, i.e., the slope in the graph shown in FIG. 5b as the congestion acceleration tendency, or other indicia or descriptors.

In one implementation, the server 100 may prevent the size of information which it should transmit from becoming excessively large by maintaining the ratio of the current congestion and travel time status to the predicted congestion and travel time status below an appropriate level (e.g., 3:1).

Figure 6A:
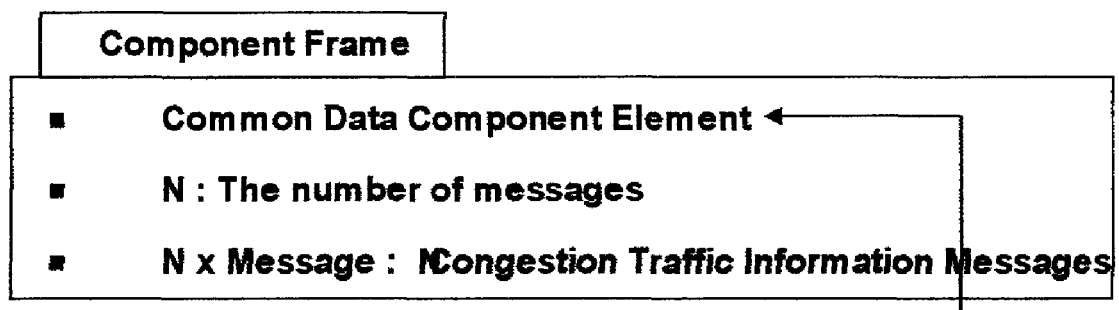
FIG. 6a shows syntax of a part of component frame that includes a common data table including information to which a plurality of components refers in common in accordance implementation.

In order to avoid repetition of transmission of similar information, information that may be used commonly may be inserted in a message sequence header 601 of a component frame as a common data table, an example of which is illustrated in FIG. 6a. The components may refer to common information written in the table, as a result, a field for the common information, e.g., a length field may not assigned to the components.

FIG. 6b shows structure of an example of a common data component element (common data table) that is inserted in a component frame as shown in FIG. 6a. As shown, the element is composed of one or more common data component template (table entry) including common information and a field for the number of included templates. FIG. 6c shows structure of an example of a common data component template. As shown, it may be composed of an object identifier (ID) indicative of an object using common information, and a field in which common information, e.g., data length is written. In the present implementation, a field of 'data component length expressed in byte' may be removed in the component structures of FIGS. 3b to 3e, and FIGS. 4b to 4d.

Figure 7:
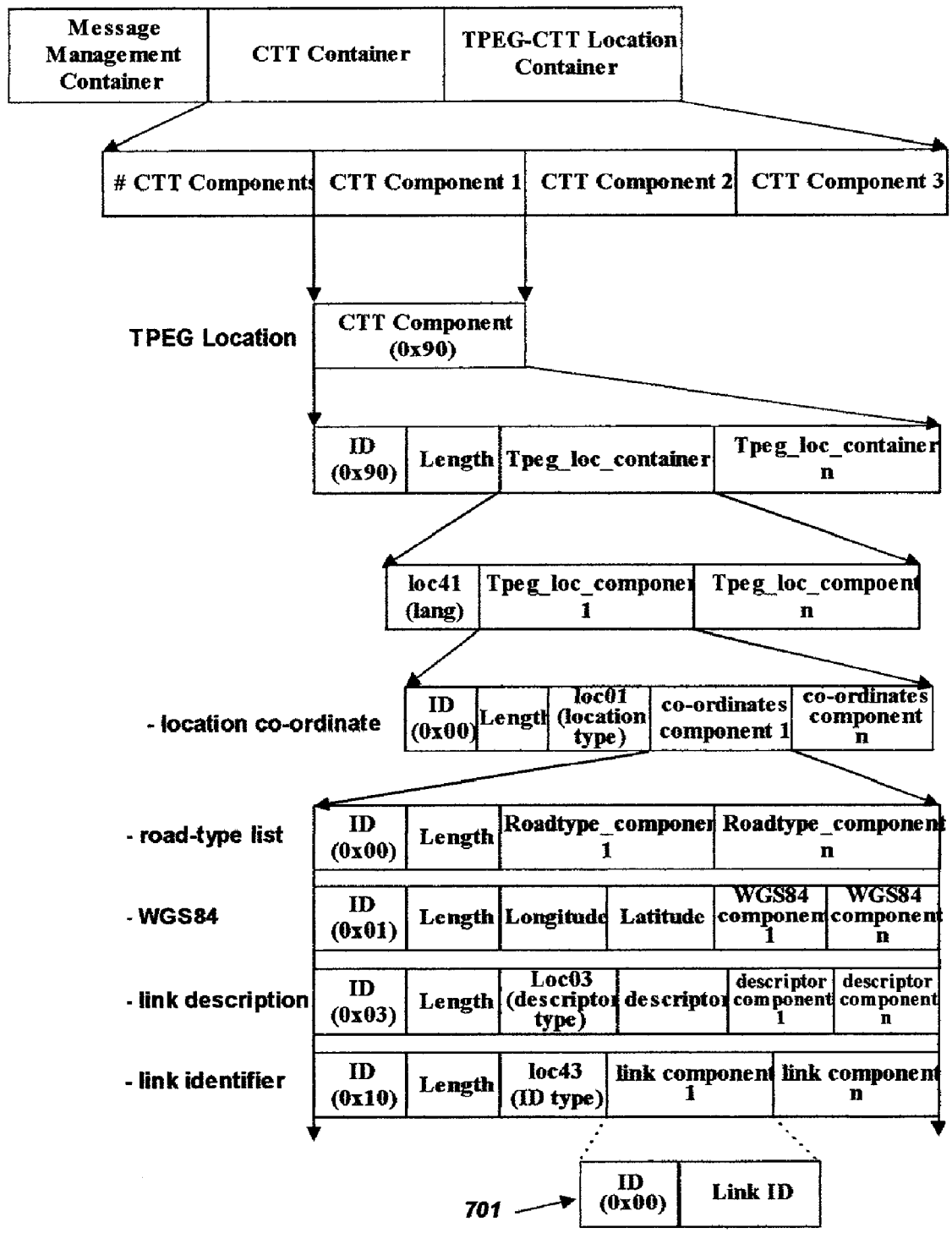
FIG. 7 illustrates a transfer format in a case in which a common data component element is organized and provided for components included in TPEG location container

FIG. 6c is only an example, and the present disclosure may also be applicable to another component. For example, a link component 701, which is transmitted in the format shown FIG. 7, may not have information, e.g., length information by assigning common information ID and using common information. Besides link components, road type component, WGS84 component, and link description component also may not have length information, for example, therein by using a common data component element.

Figure 6D:
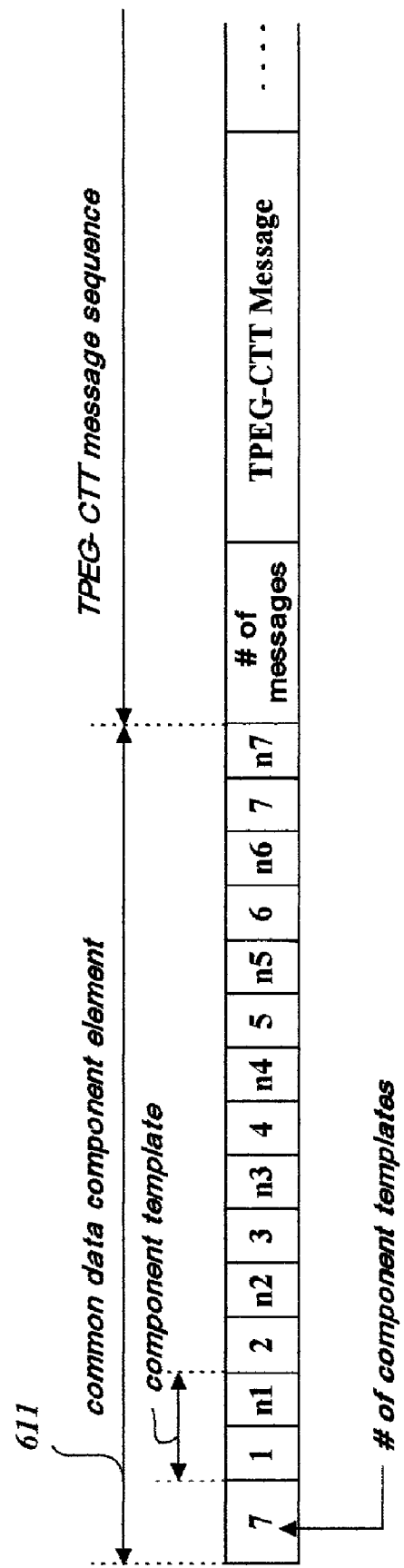
FIG. 6d illustrates a transfer format of a component frame organized according to syntaxes of FIGS. 6a to 6c.

FIG. 6d shows an example of a common data component element centered structure of a component frame that may be transmitted with the common data component element 611 added for seven object identifiers (IDs) illustrated in FIG. 6c.

As shown, in one implementation in which a common data component element is provided, if status components for, e.g., average speed on a link, link travel time, link delay time, congestion status, predicted average speed, predicted link travel time, and speed tendency, and a link component are transmitted N1, N2, N3, N4, N5, N6, N7 and N8 times in a single component frame, and a filed for indicating information length is 1 byte, transmitted data can be reduced by (N1+N2+N3+N4+N5+N6+N7+N8−4) bytes per a component frame in comparison with each component carries length field.

Figure 9B:
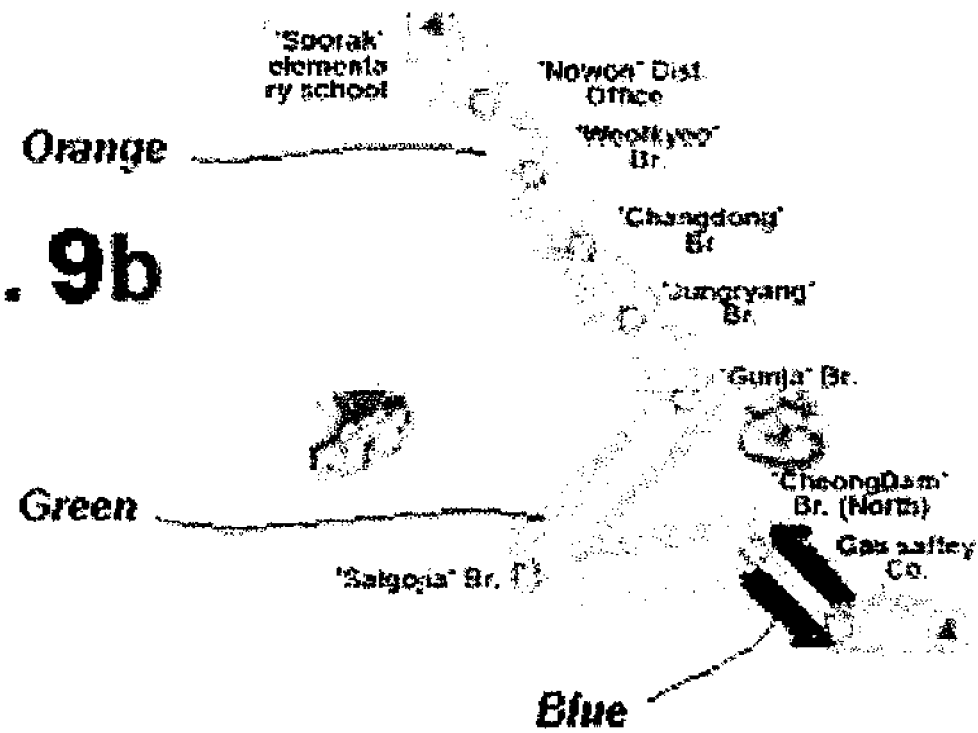
Figure 9C:
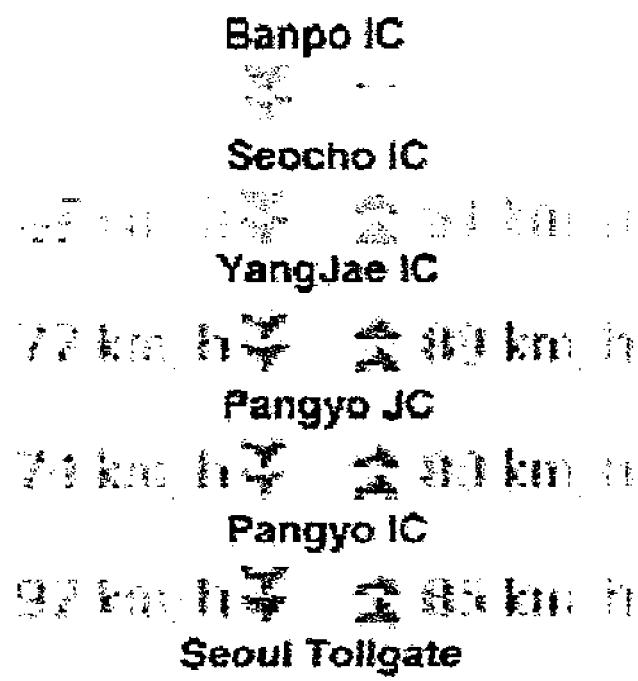
Figure 10:
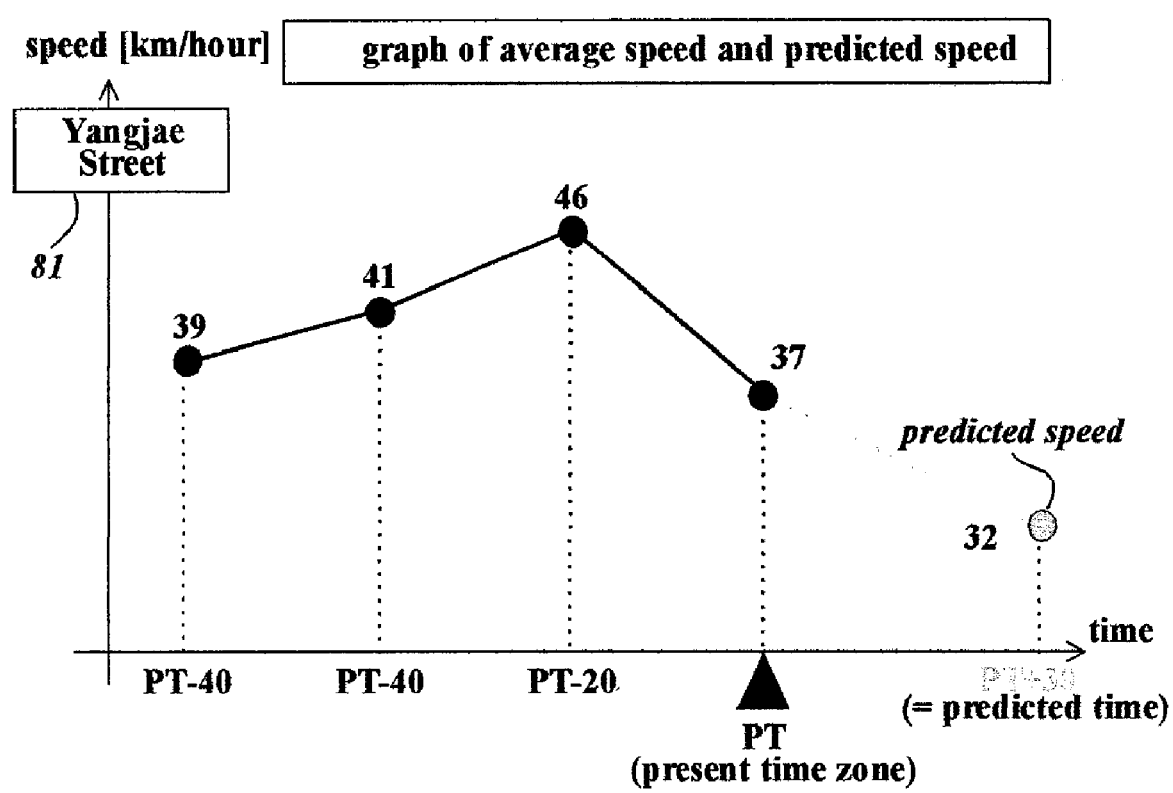
FIG. 10 illustrates an example of a graphical user interface configured to display the average speed predicted for a selected link.

FIG. 8 is an example of a block diagram of a navigation terminal for receiving traffic information transmitted from the server 100. FIGS. 8-10 are example implementations of systems for receiving and utilizing traffic information, and interfaces used to output information generated by such systems. Other systems may be organized differently or include different components.

As illustrated by FIG. 8, the navigation terminal comprises a tuner 1 for receiving modulated traffic information signals by resonating at the required frequency band, a demodulator 2 for outputting traffic information signals by demodulating the modulated signals from the tuner 1, a TPEG-CTT decoder 3 for obtaining traffic information by decoding the demodulated traffic information signals, a GPS module 8 for calculating the current position (i.e., latitude, longitude, and altitude) by receiving signals from a plurality of low-orbit satellites, storage structure 4 for storing various graphic data and an electronic map including information on links and nodes, an input device 9 for receiving user input, a navigation engine 5 for controlling screen display based on the user input, the current position, and obtained traffic information, a memory 5a for storing data temporarily, an LCD panel 7 for displaying data, and an LCD drive 6 for driving the LCD panel 7 according to data to be presented. The input unit 9 may be a touch screen incorporated into the LCD panel 7.

The tuner 1 tunes to the frequency of the signals transmitted by the server 100 and the demodulator 2 demodulates the tuned signals in a predetermined manner. The TPEG-CTT decoder 3 decodes the demodulated signals into a TPEG-CTT message sequence as shown in FIG. 2a, interprets each TPEG message included in the TPEG-CTT message sequence, and sends necessary information and/or control signals to the navigation engine 5. In the implementations of FIGS. 6a to 6d, the common data component element extracted by decoding is temporally stored and information and/or control signals obtained from decoding each TPEG-CTT message is sent to the navigation engine 5. The length information necessary for decoding components with each TPEG-CTT message is referred from the stored common data component element. The variety of information and/or control signals obtained by decoding of the TPEG-CTT decoder 3 is provided for the navigation engine 5.

For purposes of brevity, the following description will focus mainly on basic congestion and travel time status shown in FIGS. 3b through 3e and predicted congestion and travel time status shown in FIGS. 4b through 4d though other information is involved.

The TPEG-CTT decoder 3 extracts date/time and message generation time included in the message management container of each TPEG message and determines if the following container is a CTT event container based on 'message element' information (i.e. an identifier). If it is determined that the following container is a CTT event container, the TPEG-CTT decoder 3 provides the navigation engine 5 with the information obtained from the CTT component included in the CTT event container so that the navigation engine 5 may display congestion and travel time status and predicted congestion and travel time status, which will be described below. Providing the navigation engine 5 with the information may include determining, based on identifiers, that the traffic information includes a message management container including status information within various message components within the message management container. The components may each include different status information associated with different links or locations and identifiers associated with the different status information. The containers and components may each include information associated with a generation time, version number, data length, and identifiers of included information.

In the implementations of FIGS. 6a to 6d, information, e.g., length of average speed on a link included in each status component may be regarded by information of ID 1 written in the common data component template within the stored common data component element, and data may be as the information of ID 1 indicates. A similar process may be applicable to other information, for example, link travel time, predicted average speed and so on.

The TPEG-CTT decoder 3 may extract information on the link location for which the previously obtained information is intended from the following TPEG-CTT location container. In implementations described with respect to FIGS. 6a to 6d, length information for link identifier (Link ID) carried in a link component may be obtained from the stored common data component element. A similar process may be applied to other components that use common data component element.

The obtained position information may be the coordinates (i.e., latitudes and longitudes) of the start and end positions or an ID that may be uniquely assigned to each link, depending on the type of the TPEG-CTT location container. If the navigation terminal is equipped with the storage structure 4, the navigation engine 5 may find the location of the link for which the received traffic information is intended with reference to the information on each link and node stored in the storage structure 4. If necessary, the navigation engine 5 may convert the coordinates of a link into a link ID or vice versa.

The navigation engine 5 reads a part of the electronic map centered around the position coordinates received from the GPS module 8 from the storage structure 4 and displays the map on the LCD panel 7 via the LCD drive 6. A particular graphic symbol is displayed at the location corresponding to the current position on the LCD panel 7.

The navigation engine 5 displays the average link speed received from the TPEG-CTT decoder 3 at a location corresponding to the coordinates or link ID delivered via the TPEG-CTT location container following the container delivering the average link speed. There are various processes for the navigation engine 5 to display the traffic information. For example, the navigation engine 5 may show links in different colors according to the average speed at the links as shown in FIGS. 9a and 9b, where the colors red, orange, green, and blue colors themselves not shown)may be used to indicate average speeds of 0~10 km, 10~20 km, 20~40 km, over 40 km, respectively. Alternatively, the navigation engine 5 may show the average link speed in numbers at each link as shown in FIG. 9c, or a combination of colors and numbers may be used. In addition, or as an alternative, the navigation engine 5 may use similar display tools to display the congestion acceleration tendency received from the TPEG-CTT decoder 3 at the corresponding link, or through the use of other display tools such as through the use of an icon or a string (e.g., 'improved' if the value of the congestion acceleration tendency is 1 and 'deteriorated' if the value is 2). In this case, the navigation engine 5 maintains the status unchanged if the value of the congestion acceleration tendency is 0 or 3. If the congestion acceleration tendency is received in the form of the rate of change of the average speed, the navigation engine 5 displays the value only when a request from the user is received to prevent visual confusion of the user. The rate of change may be displayed together for a user-chosen route or a front link.

If the navigation terminal is not equipped with the storage structure 4 for storing an electronic map, the terminal may show the average link speed at links located in front of the current position in different colors as shown in FIG. 9b, or in numbers, as shown in FIG. 9c. If the route of the vehicle with the navigation terminal installed is determined, the navigation terminal may show the average speed at the links included in the determined route instead of the links located in front of the current position.

The navigation engine 5, responsive to user input, may display the link travel time, the link delay, and the congestion type received from the TPEG-CTT decoder 3 on the LCD panel 7 instead of or simultaneously with the average link speed.

If the user requests predicted congestion and travel time status through the input unit 9, the navigation engine 5 displays the predicted average link speed at each link received from the TPEG-CTT decoder 3 in colors or in numbers instead of the current average link speed. In this case, the colors or numbers describing the predicted status may be displayed simultaneously with the current average link speed but the location or used colors may be different. If the user switches the display mode to see the predicted link travel time instead of the predicted average link speed, the navigation engine 5 displays the predicted link travel time on the electronic map or graphics on the LCD panel 7.

If the navigation engine 5 is capable of auto-routing, the navigation engine 5 may search or research the desirable route based on the received predicted average link speed or predicted link travel time. For example, the navigation engine 5 finds the shortest time path to the destination by using the predicted link average time or predicted link travel time at each link to be reached 30 minutes later at the current speed.

If the terminal in FIG. 6 is equipped with a voice output capability, the terminal may audibly output the received predicted status or congestion tendency information for a specified link or links.

The information and/or control signals received from the TPEG-CTT decoder 3 are temporarily stored in the rewritable memory 5a and used by the navigation engine 5. After using the information stored in the memory 5a, the navigation engine 5 may store the average link speed or link travel time at intervals of, such as, for example, 20 minutes (e.g., 1:00, 1:20, 1:40) for the last 1 hour. The interval of storage may differ depending on the storage capacity of the memory 5a. By automatically expiring the information from within memory, the system may be assured that it is working with recent information when consulting the contents of the memory, and thus may be able to represent information as current with confidence without having to otherwise maintain or check information reflecting when the stored data was collected/aggregated/stored.

If a specific link is selected by the user while the average speed at each link is stored in the memory 5a, the navigation engine 5 controls the LCD drive 6 so that the history of the average link speed or the history of the link travel time at the specified link is displayed as a graph shown in FIG. 10. In the graph, the unit of the displayed numbers is km/h and the name 81 of the link is displayed on the graph. The link name is received along with the coordinates of the link or link ID through the TPEG location container 23 or included in the electronic map stored in the storage structure 4. The current congestion status and predicted congestion status or amount, or other status may be displayed in other or different ways.

If the predicted congestion status is not included in the received traffic information, the navigation engine 5 may predict the average speed using the current average speed and the history of the average link speed stored in the memory 5a and display the predicted average link speed, as shown in FIG. 10. The method for predicting the average link speed may be the same as the aforementioned prediction method executed in the server 100.

While the disclosure has discussed a limited number of implementations, those skilled in the art, having the benefit of this disclosure will appreciate numerous modifications and variations therefrom. It is intended that all such modifications and variations fall within the spirit and scope of this disclosure.

What is claimed is:

1. A method for processing traffic data at a receiver, the method comprising:
receiving a message structure including traffic data including;
information corresponding to a prediction of an amount of congestion for a particular link and a first identifier which enables a determination that the traffic data relates to the prediction of the amount of congestion for the particular link,
information corresponding to a prediction of an average speed for the particular link and a second identifier which enables a determination that the traffic data relates to the prediction of the average speed for the particular link,
information corresponding to a current average speed for the particular link and a third identifier which enables a determination that the traffic data relates to the current average speed for the particular link, information corresponding to a current amount of congestion for the particular link and a fourth identifier which enables a determination that the traffic data relates to the current amount of congestion for the particular link, information corresponding to a location associated with the particular link, and information corresponding to a message management structure including information corresponding to a generation time of information reflected in the traffic data; and decoding the traffic data.

2. The method of claim 1, wherein the generation time included within the received message management structure relates to a plurality of message component structures that correspond to more than one of a predicted or current traffic tendency, a predicted or current amount of traffic, a predicted or current speed, or a predicted or current time to traverse a particular link.

3. The method of claim 2, wherein each message component structure further comprises an identifier specific to a type of information.

4. The method of claim 3, further comprising receiving information corresponding to a chronological indication associated with the predicted congestion amount revealed by the received information.

5. The method of claim 4, wherein the chronological indication reflects a particular time of day for which the predicted congestion amount corresponds.

6. The method of claim 4, wherein the chronological indication is reflected using the universal time co-ordinated standard.

7. The method of claim 1, wherein the predicted amount of congestion reflects an average of more than one indication of congestion amount associated with the link.

8. The method of claim 1, wherein the predicted amount of congestion reflects a weighted summation of more than one indication of congestion amount associated with the link.

9. The method of claim 1, wherein receiving information corresponding to a prediction of an amount of congestion includes receiving a value associated with a text description of an amount of congestions, and determining, with the received value, the text description.

10. The method of claim 1, wherein receiving information corresponding to a prediction of an amount of congestion includes receiving a predicted congestion amount for the link including a text descriptor.

11. An apparatus for processing traffic data, the apparatus comprising:
a receiver configured to receive a message structure including traffic data including:
information corresponding to a prediction of an amount of congestion for a particular link and a first identifier which enables a determination that the traffic data relates to the prediction of the amount of congestion for the particular link, information corresponding to a prediction of average speed of the particular link and a second identifier which enables a determination that the traffic data relates to the prediction of the average speed for the particular link, information corresponding to a current average speed of the particular link and a third identifier which enables a determination that the traffic data relates to the current average speed for the particular link, information corresponding to a current amount of congestion for the particular link and a fourth identifier which enables a determination that the traffic data relates to the current amount of congestion for the particular link, information corresponding to a location associated with the particular link, and information corresponding to a message management structure including information corresponding to a generation time of information reflected in the traffic data; and a decoder configured to decode the received traffic data.

12. The apparatus of claim 11, wherein the traffic data includes information corresponding to a version number of information reflected in the traffic data.

13. The method of claim 1 wherein decoding the traffic data includes:
determining the prediction of the amount of congestion for the particular link based on the first identifier;
determining the prediction of the average speed for the particular link based on the second identifier;
determining the current average speed for the particular link based on the third identifier; and
determining the current amount of congestion for the particular link based on the fourth identifier.

14. The method of claim 1 further comprising enabling, based on the decoded traffic data, display of one or more of the prediction of the amount of congestion for the particular link, the prediction of the average speed for the particular link, the current average speed for the particular link, and the current amount of congestion for the particular link.

* * * * *